(12) United States Patent
Wang et al.

(10) Patent No.: US 8,165,073 B2
(45) Date of Patent: Apr. 24, 2012

(54) RELAY-STATION ASSIGNMENT/RE-ASSIGNMENT AND FREQUENCY RE-USE

(75) Inventors: Shu-Shaw Wang, Arlington, TX (US);
Adrian Boariu, Irving, TX (US);
Shashikant Maheshwari, Irving, TX (US); Tejas Bhatt, Irving, TX (US);
Anthony Reid, Plano, TX (US)

(73) Assignee: Nokia Corporation, Espoo (FI)

( * ) Notice: Subject to any disclaimer, the term of this patent is extended or adjusted under 35 U.S.C. 154(b) by 1269 days.

(21) Appl. No.: 11/888,800

(22) Filed: Aug. 2, 2007

(65) Prior Publication Data
US 2008/0031197 A1   Feb. 7, 2008

Related U.S. Application Data

(60) Provisional application No. 60/857,679, filed on Nov. 7, 2006, provisional application No. 60/835,783, filed on Aug. 4, 2006.

(51) Int. Cl.
*H04W 4/00* (2009.01)

(52) U.S. Cl. ...... 370/329; 370/230; 370/236; 370/310.2

(58) Field of Classification Search .................. 370/229, 370/230, 230.1, 236, 254, 310, 310.2, 328, 370/329, 331–334; 455/436, 422.1, 443, 455/447, 7, 13.1
See application file for complete search history.

(56) References Cited

U.S. PATENT DOCUMENTS

| | | | |
|---|---|---|---|
| 5,483,666 A | 1/1996 | Yamada et al. | 455/33.1 |
| 6,484,030 B1 * | 11/2002 | Antoine et al. | 455/444 |
| 7,386,036 B2 * | 6/2008 | Pasanen et al. | 375/211 |
| 7,859,465 B2 * | 12/2010 | Wu | 342/465 |
| 2004/0185859 A1 * | 9/2004 | Barkan | 455/449 |
| 2007/0123292 A1 * | 5/2007 | Kang et al. | 455/525 |
| 2007/0189204 A1 * | 8/2007 | Li et al. | 370/328 |
| 2007/0249386 A1 * | 10/2007 | Bennett | 455/550.1 |
| 2008/0253341 A1 * | 10/2008 | Cordeiro et al. | 370/338 |
| 2008/0260000 A1 * | 10/2008 | Periyalwar et al. | 375/133 |

(Continued)

FOREIGN PATENT DOCUMENTS
GB    2304495 A    3/1997
(Continued)

OTHER PUBLICATIONS

"Partially harmonized version of 802.16j(Mobile Multihop Relay) Usage Models", IEEE C802.16j-06/34, May 11, 2006, 27pages.

(Continued)

*Primary Examiner* — Kwang B Yao
*Assistant Examiner* — Nguyen Ngo
(74) *Attorney, Agent, or Firm* — Harrington & Smith

(57) ABSTRACT

A prospective relay station sends a report indicative of radio resource sets/preamble sequences used by its neighbors. Where the reported radio resource sets comprise less than all available radio resource sets, a radio resource set that is not indicated in the report is assigned; else where the reported radio resource sets comprise all available radio resource sets, a resource set indicated in the report is assigned. A message is sent to the prospective relay station indicates the assigned radio resource set and an identifier for use as an enabled relay station. The message may include signal strength and IDs. Apparatus, methods and computer programs are detailed for both a base station and the relay node. Radio resource set re-assignment, managed mode relay operations (where the base station schedules traffic among relays using the same radio resource set), and power control of relays and associated mobile stations are also described.

33 Claims, 11 Drawing Sheets

U.S. PATENT DOCUMENTS

| | | | |
|---|---|---|---|
| 2009/0073916 A1* | 3/2009 | Zhang et al. | 370/315 |
| 2009/0252079 A1* | 10/2009 | Zhang et al. | 370/315 |
| 2009/0303895 A1* | 12/2009 | Zhang et al. | 370/252 |
| 2009/0303918 A1* | 12/2009 | Ma et al. | 370/315 |

FOREIGN PATENT DOCUMENTS

| | | |
|---|---|---|
| WO | WO-03/013168 A1 | 2/2003 |

OTHER PUBLICATIONS

"Harmonized definitions and terminology for Mobile Multihop Relay", IEEE C802.16j-06/041, May 11, 2006, 5 pages.

"Part 16: Air Interface for Fixed and Mobile Broadband Wireless Access Systems", Multihop Relay Specification, Relay Task Group of IEEE 802.16, Jun. 6, 2007, 191 pages.

* cited by examiner

RELAY-STATION ASSIGNMENT/RE-ASSIGNMENT AND FREQUENCY RE-USE

CROSS-REFERENCE TO RELATED U.S. PROVISIONAL PATENT APPLICATION

This application claims priority to Provisional U.S. Patent Applications No. 60/835,783 (filed on Aug. 4, 2006) and 60/857,679 (filed on Nov. 7, 2006), the contents of both being hereby incorporated by reference in their entirety including Exhibit A attached to each.

TECHNICAL FIELD

The exemplary and non-limiting embodiments of this invention relate generally to wireless communications systems, devices, methods and computer program products, specifically in the context of mobile multi-hop relays in which a coverage area of a base station has more than one relay station.

BACKGROUND

Following are acronyms used in the description below:
MMR mobile multihop relay
BS base station
RS relay station
SS subscriber station
MS mobile station (one type of SS)
DL downlink
UL uplink
OFDMA orthogonal frequency division multiplexing access
TTD time division duplex IEEE 802.16j standardization task group is working on MMR (Mobile Multihop Relay) enabled networking in WiMAX systems. FIG. 1 illustrates a network 10 environment with various usage scenarios being addressed by that 802.16j Task Group. A BS 12 provides coverage to various SSs within a cell 14, which may or may not be regularly shaped. MMR is one technique to address coverage gaps within the cell 14, and also to extend coverage beyond the edges of the cell 14. RSs 16 are used to relay signals from the BS 12 to the SSs, and where appropriate from the SSs back to the BS 12. For example, an RS 16 may be used to provide more robust coverage within a building 18; within a tunnel 20, in a valley between buildings 22a or shadow of a building 22c or other coverage hole 22b within the cell 14; an RS 16 may be used to extend coverage of the BS 12 beyond an edge of the cell as shown at the cell extensions 26a and 26b-26c. Two usage scenarios are of note. The multihop aspect of MMR is shown in the cell extensions 26b and 26c, which extend coverage by the BS 12 by a series of two or more RSs 16. While some RSs 16 may be stationary as in the depicted towers, some may also be mobile as with the RS 16' disposed on the subway car (perhaps multi-hopping through other RSs 16 fixed within the tunnel 20) and the RS 16' disposed on the bus so as to enable robust coverage for riders. SSs are the end users that do not form part of the network 10 but rather access its services, typically on a subscription or prepaid basis. MSs 22 are the most common type of SS, though SSs need not be mobile in general. MMR therefore extends cell 14 coverage, and enhances link budget for indoor 18 or underground 20 penetration where the direct signal to and from the BS 12 would be otherwise insufficient.

Usage models are also used to describe the different reasons that a network operator/carrier may deploy RSs. The key reasons that a carrier might deploy RSs are:
Enhanced Data Rate Coverage—Provide higher uniform signal to interference noise ratio SINR to users within the cell 14. This can also be thought of as providing higher throughput to individual MSs 22 within the entire cell.
Range Extension—Provide coverage to users outside the edge of the cell.
Capacity Enhancement—increase system capacity by deploying RSs in a pico-cell deployment enabling more aggressive frequency reuse.

MMR in a network may provide range extension of cellular coverage and improve the system data throughput. On the other hand, a MMR-enabled networking scheme may also increase the system complexity that includes the hardware entity cost of the relay station, the signaling overhead between BS-RS-MS/SS (Mobile Station/Subscriber Station), and the interference between two overlapped RS coverages. Interference arises because the BS has limited resources from which to assign to the various RSs. Where more than one RS is in operation within a single cell 14, they may be proximal enough that channels interfere. With the increased density of RS in overlapping coverage areas, and due to the mobility of some RSs, the probability of co-channel interference between BS and RS as well as between adjacent RSs increases. Further, the BS is allocated by the network only certain frequencies/spreading codes for effecting communications within its cell 14, and these must also be managed among the RSs in order to accommodate the maximum number of SSs without sacrificing quality.

Since MMR is only recently proposed in IEEE 802.16j, channel assignment and frequency reuse in the RS level is a new problem. To the best of the inventors' knowledge, no previous solution has been presented to address co-channel interference and resource allocation among RSs of a MMR system.

SUMMARY

In accordance with one embodiment of the invention is a method that includes receiving from a prospective relay station a report indicative of radio resource sets used by neighbors of the prospective relay station. For the case a) where the reported radio resource sets comprise less than all available radio resource sets, the method comprises assigning a radio resource set that is not indicated in the report; else for the case b) where the reported radio resource sets comprise all available radio resource sets, the method comprises assigning a resource set indicated in the report. Further in the method a message is sent to the prospective relay station. The message is indicative of the assigned radio resource set and includes an identifier for the prospective relay station to change the prospective relay station to an enabled relay station.

In accordance with another embodiment of the invention is an apparatus that includes a receiver, a processor and a transmitter. The receiver is adapted to receive from a prospective relay station a report indicative of radio resource sets used by neighbors of the prospective relay station. The processor is adapted, for the case a) where the reported radio resource sets comprise less than all available radio resource sets, to assign a radio resource set that is not indicated in the report; else for the case b) where the reported radio resource sets comprise all available radio resource sets, the processor is adapted to assign a resource set indicated in the report. The transmitter is adapted to send to the prospective relay station a message indicative of the assigned radio resource set and which includes an identifier for the prospective relay station to change the prospective relay station to an enabled relay station.

In accordance with yet another embodiment of the invention is a program of machine-readable instructions embodied on a computer readable memory and executable by a digital data processor to perform actions directed toward assigning radio resources to a relay station. In this embodiment the actions include receiving from a prospective relay station a report indicative of radio resource sets used by neighbors of the prospective relay station. The actions further include, for the case a) where the reported radio resource sets comprise less than all available radio resource sets, assigning a radio resource set that is not indicated in the report; else for the case b) where the reported radio resource sets comprise all available radio resource sets, assigning a resource set indicated in the report. A message is sent to the prospective relay station. The message is indicative of the assigned radio resource set and includes an identifier for the prospective relay station to change the prospective relay station to an enabled relay station.

In accordance with still another embodiment of the invention is an apparatus that includes receiving means, processing means, and transmitting means. The receiving means is for receiving from a prospective relay station a report indicative of radio resource sets used by neighbors of the prospective relay station. For the case a) where the reported radio resource sets comprise less than all available radio resource sets, the processing means is for assigning a radio resource set that is not indicated in the report; else for the case b) where the reported radio resource sets comprise all available radio resource sets, the processing means is for assigning a resource set indicated in the report. The transmitting means is for sending to the prospective relay station a message indicative of the assigned radio resource set and an identifier for the prospective relay station to change the prospective relay station to an enabled relay station. In a particular embodiment, the receiving means is a receiver, the processing means is a digital processor, and the transmitting means is a transmitter, wherein the receiver may be a component of the transceiver or separate from it.

In accordance with still another embodiment of the invention is a method that includes scanning neighbor nodes for radio resource sets in use by those neighbor nodes, and wirelessly sending a report indicative of the radio resource sets. For the case a) where the reported radio resource sets comprise less than all available radio resource sets, this method selects a radio resource set that is not indicated in the report; else for the case b) where the reported radio resource sets comprise all available radio resource sets, this method selects a radio resource set indicated in the report and grouping with the neighbor node using the selected radio resource set. Further in the method and responsive to receiving a message indicative of the selected radio resource set and an identifier, traffic is relayed using either the selected radio resource set or is transparently relayed, without using a radio resource of any of the available resource sets.

In accordance with still another embodiment of the invention is an apparatus that includes a receiver, a transmitter and a processor. The receiver is adapted to scan neighbor nodes for radio resource sets in use by the neighbor nodes. The transmitter is adapted to wirelessly send a report indicative of the radio resource sets. For the case a) where the reported radio resource sets comprise less than all available radio resource sets, the processor is adapted to select a radio resource set that is not indicated in the report; else for the case b) where the reported radio resource sets comprise all available radio resource sets, the processor is adapted to select a radio resource set indicated in the report and grouping with the neighbor node using the selected radio resource set. Responsive to receiving a message indicative of the assigned radio resource set and an identifier, the transmitter and receiver are adapted to relay traffic using either the assigned radio resource set or to relay the traffic transparently without using a radio resource of any of the available resource sets.

These and other aspects of the invention are detailed with particularity below.

BRIEF DESCRIPTION OF THE DRAWINGS

Exemplary embodiments of the present invention are detailed below with reference to the following drawing figures.

DETAILED DESCRIPTION

In this disclosure is described a method, apparatus and computer program embodied on a storage medium to reduce RS interference from another RS (or BS) transmission during the initial network entry of one of the RSs, and also during operation of RSs such as where one of them is non-stationary and may otherwise interfere with another RS (or the BS) as it moves through the cell. The design considerations detailed herein not only reduce/minimize RS interference from the other RSs, but also increases the frequency reuse possibility in all RSs in the MMR-enabled cell in order to enhance data throughput as compared to that of no MMR-enabled systems.

More particularly, embodiments of this invention find the MMR-BS assigning segments (e.g., segments "0", "1" or "2") to each initial entry RS preamble, and/or re-assigning an RS preamble segment during periodic handovers in a novel way so as to reduce the potential for co-channel interference between the overlapped RSs. Embodiments employ an algorithm disclosed herein for frequency reuse in FUSC (full usage of sub-channels) zones for interference-free RSs and in PUSC (partial use of sub-channels) zones for interfering RSs. While the description is in the context of a WiMax system (e.g., IEEE 802.16), it may be used for any system that employs relay stations under control of a base station so as to extend/enhance coverage of that BS, either within the BS's cell itself or within areas that extend beyond the BS's cell due to operation of one or more RSs.

Figure 2:
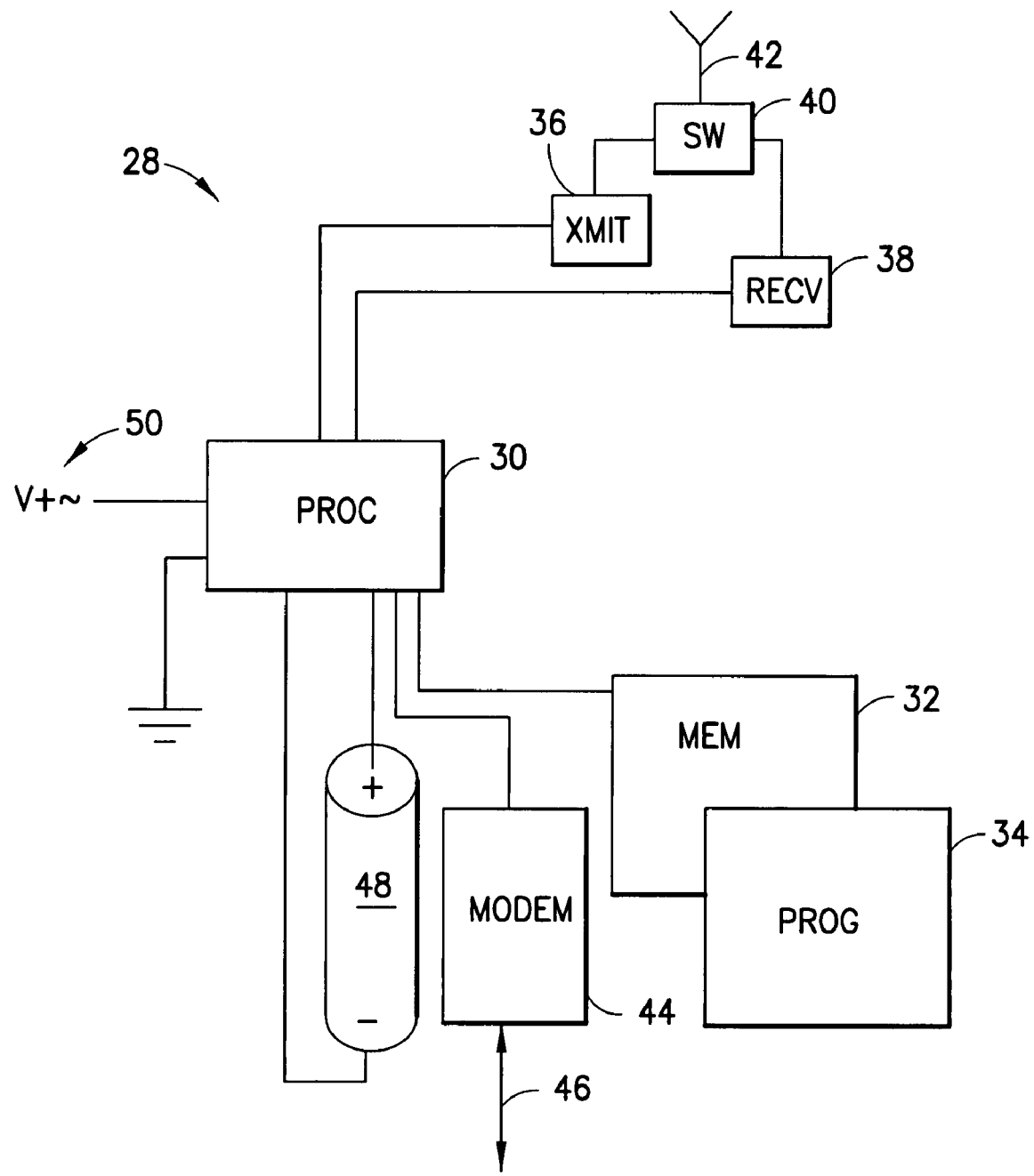
FIG. 2 is a schematic block diagram showing relevant components of a relay station according to embodiments of the invention.

Reference is now made to FIG. 2 for illustrating a simplified block diagram of an exemplary electronic device 28 that is suitable for use in practicing the exemplary embodiments of this invention. The device 28 may be a BS 12, a RS 16, or any entity operating with similar functions as those described herein for a BS or RS. The device 28 includes a data processor (DP) 30, a memory 32 that stores a program 34, and a suitable radio frequency (RF) transceiver for bidirectional wireless communications with subscriber stations such as MSs 24. The transceiver is shown in FIG. 2 as a transmitter 36 and receiver 38 coupled through a dipole switch 40 to an antenna 42. Alternatives to the dipole switch 40 are known, and the antenna 42 may be one of several for MIMO communications over the wireless channels. The device 28 may further include a modem 44 coupled to the BS (or RS) via a hardwire link 46 (where the device 28 is stationary). Alternatively, the link to the BS/RS may be wireless or a combination of hardwire and wireless. The device 28 draws power for operation from a battery 48 (as with a mobile RS or while any RS/BS is in a power backup mode) and/or an AC power source 50.

Figure 1:
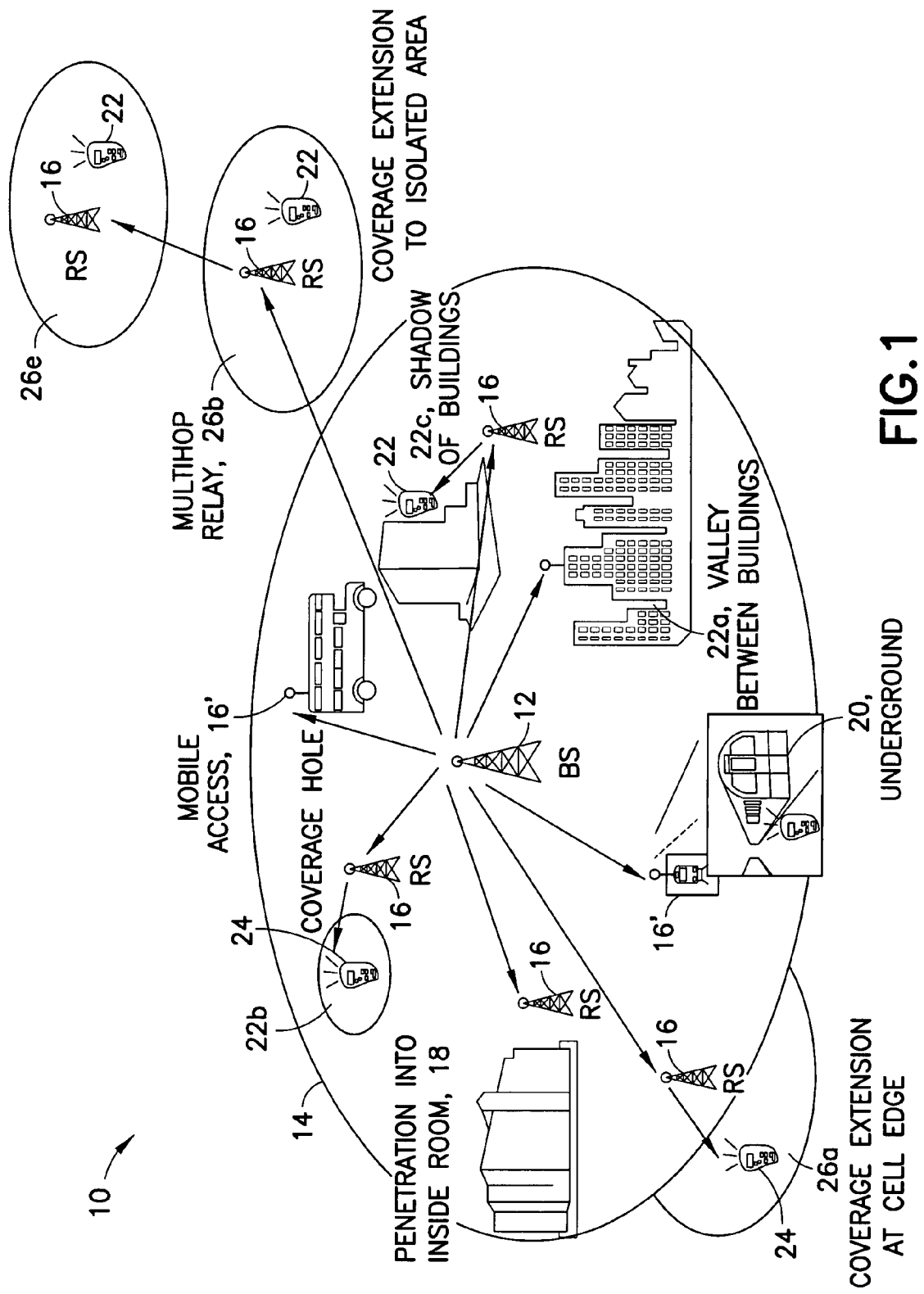
FIG. 1 illustrates a network environment with a base station expanding its coverage to subscriber stations by use of relay stations, for which embodiments of the invention are advantageous.

At least one of the programs 34 stored in the memory 32 is assumed to include program instructions that, when executed by the associated processor 30, enable the electronic device to operate in accordance with the exemplary embodiments of this invention, as will be discussed below in greater detail. Not shown in FIG. 1 but assumed is the presence of a radio network controller RNC or similar such higher network node that coordinates among various BSs and allocates radio resources to those BSs. Packet scheduling is typically within the BS but may be retained in some circumstances by the RNC. Each of the RNC, the BS, and the various RSs (whether mobile or stationary) include at least some of the various components of FIG. 2.

In general, the various embodiments of the MS 24 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The embodiments of this invention may be implemented by computer software executable by the processor 30 of the BS and/or RS, or by hardware, or by a combination of software and hardware.

The memory 32 may be of any type suitable to the local technical environment and may be implemented using any suitable data storage technology, such as semiconductor-based memory devices, magnetic memory devices and systems, optical memory devices and systems, fixed memory and removable memory. The processor 30 may be of any type suitable to the local technical environment, and may include one or more of general purpose computers, special purpose computers, microprocessors, digital signal processors (DSPs) and processors based on a multi-core processor architecture, as non-limiting examples.

Now are described aspects of the invention wherein a prospective RS, one not yet operating as a conduit between a SS and the BS, seeks to enter the network and act as such a conduit.

As background, the initial network entry process for BS-MS is listed in IEEE Std 802.16-2004 as amended by 802.16e-2005, both of which are herein incorporated by reference. In the frame structure, the first OFDMA symbol of the downlink transmission is the preamble, and there are three types of preamble carrier-sets. The carrier sets are defined by allocation of different sub carriers for each one of them. That is, each carrier set represents a set of OFDM sub channels, and the carrier sets are mutually exclusive of one another. Each segment uses a preamble composed of a carrier-set out of the three available carrier-sets in the following manner: segment 0 uses preamble carrier-set 0, segment 1 uses preamble carrier-set 1, and segment 2 uses preamble carrier-set 2. In the DL (DownLink) PUSC (Partial Usage of Subchannels) mode, any segment used in the preamble shall be allocated at least one group (default is 12 sub channels in case of OFDM-2048) in the DL First Zone that contains FCH and DL-MAP. The default allocated sub channel sets for segments 0, 1, 2 are sub channels 0-11, 20-31, and 40-51, respectively. For example, when segment 0 is detected in the DL preamble of the frame structure, the immediately followed First Zone PUSC (i.e., FCH and DL-MAP) messages shall use at least 12 subchannels 0-11 to encode the FCH and DL-MAP control signaling. Note that the First Zone PUSC subchannel does not have the DL permutation function applied to protect the sub-channel interference. For the no MMR-enabled system, BS is fixed and carefully designed to reduce the three-sector/cell co-channel interference. There is not much co-channel interference in a well-designed system with fixed BSs/RSs, because the PUSC mode can be used. However, in the MMR-enabled system, an RS can be turned on at any time and anywhere, and also it may have mobility. If one RS overlaps in coverage with one or more of its neighboring RSs, then the co-channel interference will be significant when RSs are using the same segment value (0, 1, or 2) for their preamble and First Zone PUSC.

In order to alleviate the co-channel interference situation, an aspect of this invention is that for the initial entry of a prospective RS into the network, the BS performs a segment assignment protocol/method, which will be shown to eliminate the interference between two overlapping RSs coverages. One exemplary frame structure for an MMR-enabled system that may be advantageously used with embodiments of this invention is detailed in a paper entitled "MMR System Level Concept" (Appendix A of the priority documents).

According to one embodiment, the initial RS preamble segment assignment (for a prospective RS) operates as follows. First, the prospective RS detects all preambles and reports to the BS those segments of preambles it detected. In this manner, the prospective RS acts as any other SS in that it is not relaying data between the BS and any other SS; it merely listens and reports. The BS then assigns a segment to the prospective RS based on those reported preambles. Two scenarios are possible. 1): For the case where the RS reported segments include fewer than all segments available to the BS for allocation (e.g., the RS reports less than all of segments 0, 1 and 2), then the BS assigns to the prospective RS one of the available segments that is not a reported segment, and the prospective RS comes online as an active RS. 2): For the case where the RS reported segments include all of the segments available to the BS for allocation (e.g., the RS reports each of segments 0, 1 and 2), then two options are available. 2a): The BS may deny the prospective RS from becoming an active RS in the cell. 2b): The BS may assign the prospective RS with one (or more) of the reported segments and allow the prospective RS to come online as an active RS within the cell only under a constraint of operating in a fully-managed mode. The fully-managed mode as used herein implies that the BS acts as scheduler for traffic between the RS and its SSs. In an embodiment, the BS can also require other RSs, sharing that same segment and which might otherwise cause co-channel interference with the (formerly prospective) RS, be constrained to operate in the fully-managed mode. By scheduling traffic through one or preferably both RSs at the same BS, interference can be reduced or eliminated by scheduling rather than by channel separation as in scenario 1).

The IEEE Std 802.16-2004 as amended by 802.16e-2005 does not specify RS neighbor detection at initial network entry. Therefore, for example, this embodiment proposes that a RS powered on in a MMR-BS coverage area shall perform the initial network entry with the MMR-BS and try to register to the MMR-BS via initial ranging. In the initial phase, the RS acts as a simple subscriber (SS), and informs the BS that it has relay capabilities. At this point it is only a potential or prospective, not an enabled RS. After that, the BS requests the potential/prospective RS to scan its neighboring RSs and search for preambles for all three possible segments (i.e., segment 0, segment 1, and segment 2). Since the preamble transmits 9 dB more energy than the normal control signal (i.e., FCH and DL-MAP signals) energy, the preamble coverage radius based on the calculation of the pathloss exponent equal to 3 for an omni transmission antenna scenario is twice as large as the normal control/data signal coverage radius, as can be seen from FIGS. 3A-3B. The potential/prospective RS reports all the detected neighboring preambles to the BS. If the potential/prospective RS is able to detect any neighboring preamble signals, than the control signal coverage between the potential/prospective RS and the neighboring RS/BS may be overlapped, and the control signals of each other can interfere when serving the MSs. Therefore, it is advisable for the BS to assign a segment value to the potential/prospective RS such that the co-channel interference that a MS detects is minimized. The assignment of the preamble segment for the potential/prospective RS is discussed below.

Figure 3A:
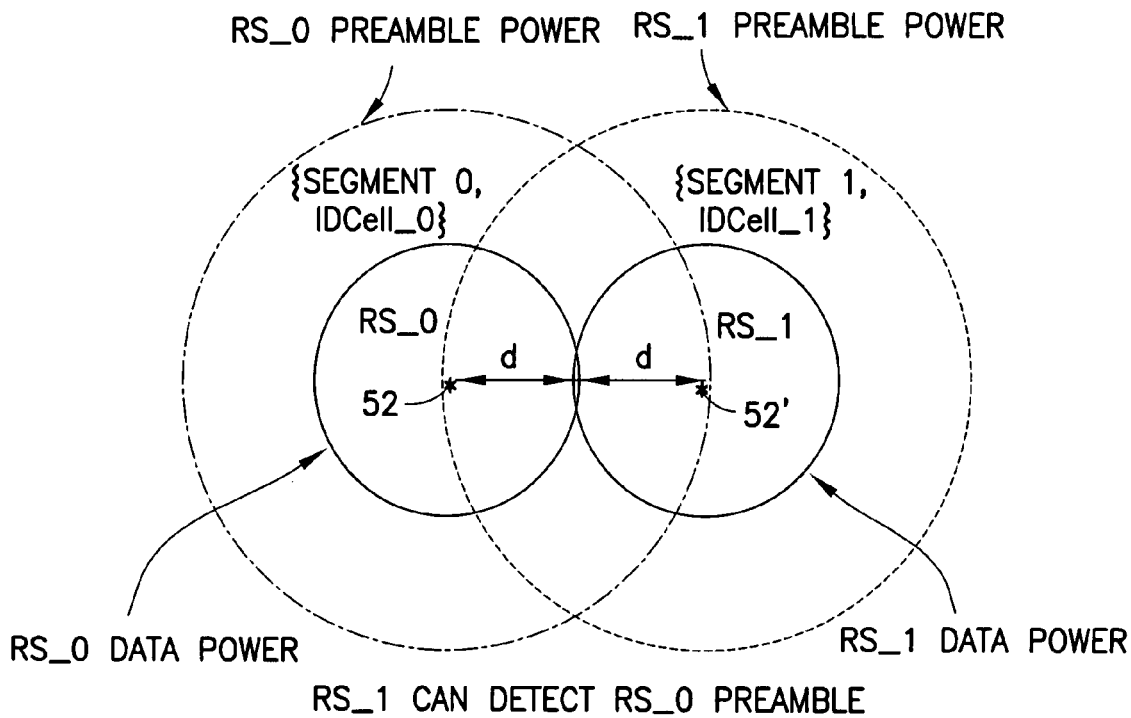
FIGS. 3A-3B are schematic illustrations of signal coverage for two adjacent relay stations with the pathloss exponent equal to 3.
Figure 3B:
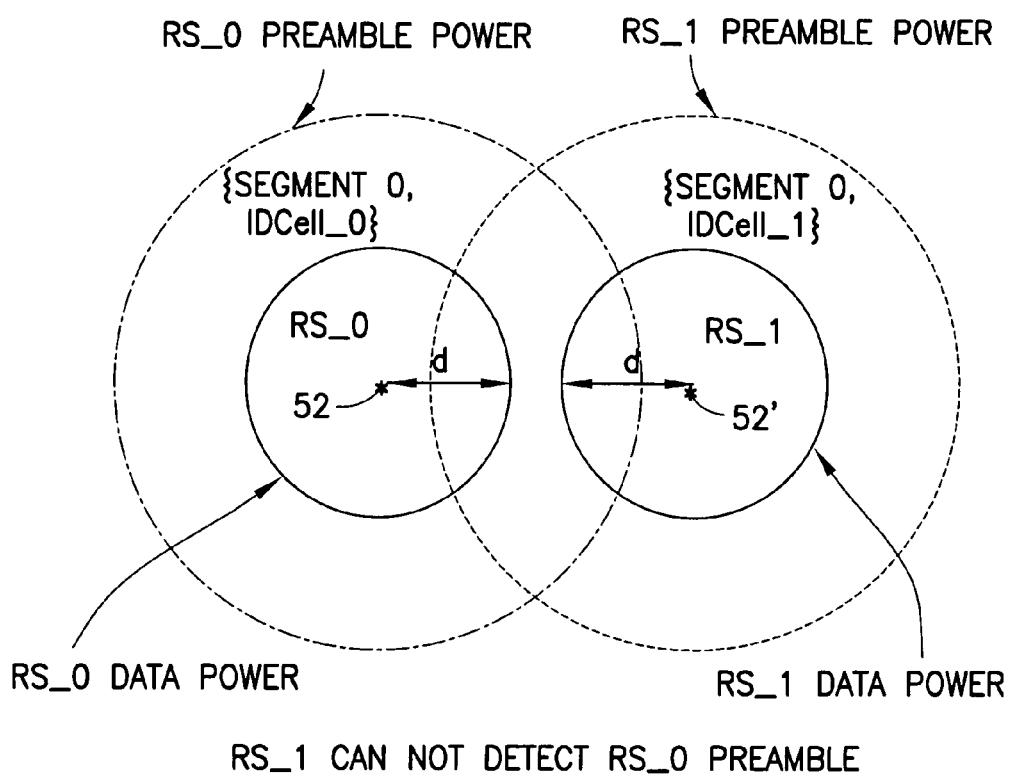

Note that FIG. 3A shows the case where a potential/prospective RS 52 is able to detect the preamble of another RS 52'. Owing to the doubled range of the higher power preamble (shown as the dashed circle) as compared to the data signal (shown as radius d), the minimal overlap of data signals as in FIG. 3A corresponds to the potential/prospective RS 52 just barely sensing the other RSs 52' preamble. For the condition of FIG. 3A wherein the potential/prospective RS 52 detects the preamble of only one other RS 52', then the BS may assign the potential/prospective RS 52 with a segment not being used by the other RS 52' (and not reported by the potential/prospective RS 52). To the contrary, FIG. 3B illustrates the condition wherein the potential/prospective RS 52 detects no other preambles. Though the preamble of the other RS 52' might interfere with the data signal or the preamble of the potential/prospective RS 52 if it were assigned the same segment, it is only within the radius of the data signal (radius d) that is of concern (though there might be some interference of preambles). In the condition of FIG. 3B, the potential/prospective RS 52 may be assigned the same segment as the existing RS 52'. While the BS may know the segment being used by the operative RS 52' prior to assigning a segment to the potential/prospective RS 52, that segment is neither detected by the potential/prospective RS 52 nor reported by it to the BS.

Figure 4:
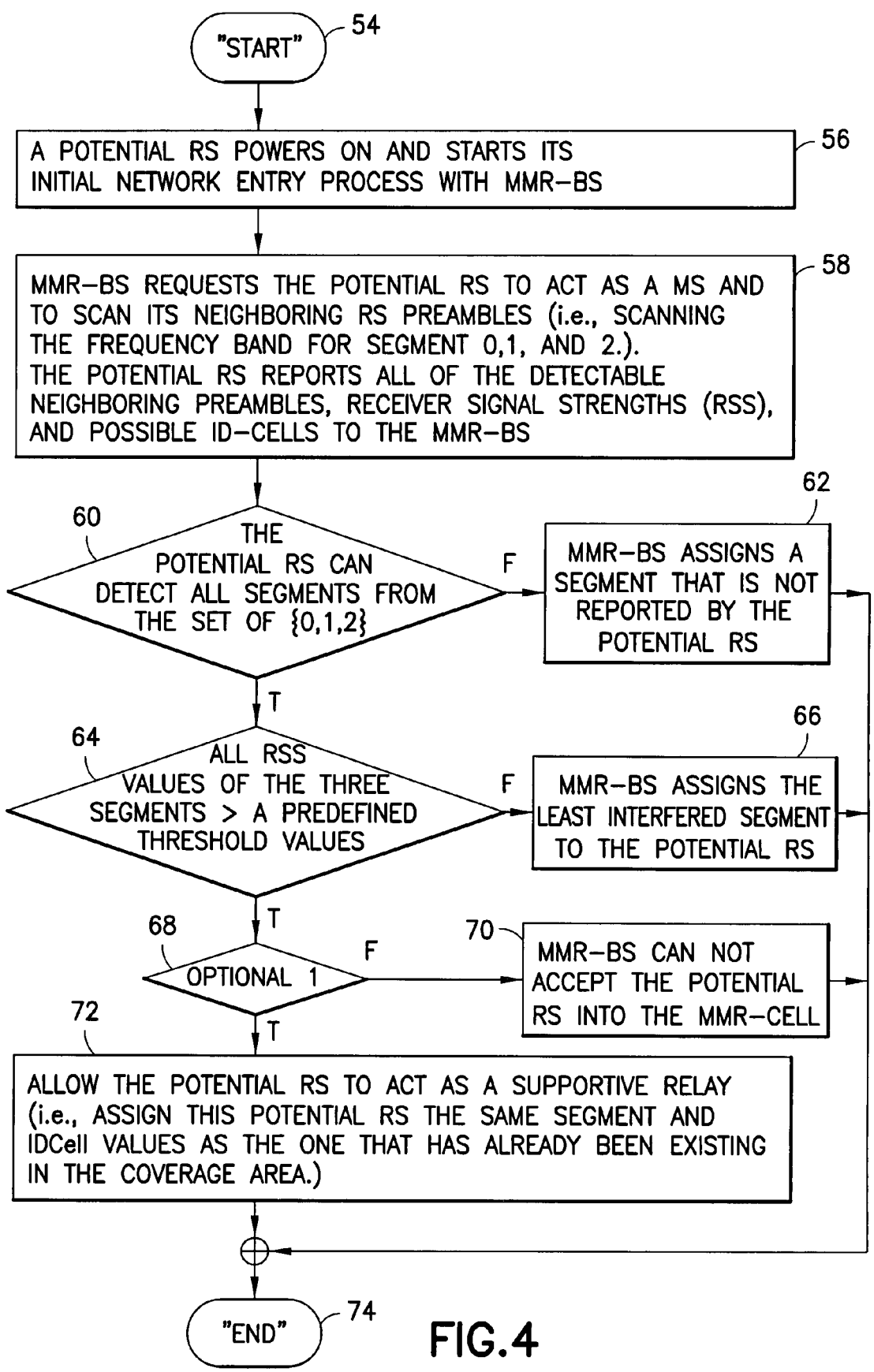
FIG. 4 is a series of process steps for a base station assigning resources to a relay station when that relay station first seeks to enter the network, according to an embodiment.

The algorithm noted above for initial segment selection is shown at FIG. 4 as process steps. To start 54 the process, a potential/prospective RS begins an initial entry process to become an active RS at block 56. This may include requesting a segment from the BS. The MMR-BS requests the potential/prospective RS at block 58 to act as a mobile station/subscriber station (e.g., to listen and report rather than act as a relay station) and to scan its neighboring RS preambles (i.e., scanning the frequency bands for segment 0, 1, and 2). The potential RS reports all of the detectable neighboring preambles, receiver signal strengths (RSS), and possibly also ID-cells to the MMR-BS. To enable this, the RSs signal an RS identification in their transmitted preambles (and the BS sends its BS identifier in its transmitted preambles). The ID-cells report is to identify other cells, not under control of the BS, which may have RSs or a BS that would interfere. If at block 60 the potential/prospective RS does not detect all segments from the set (segments 0, 1 and 2), the F path is followed to block 62 where the MMR-BS assigns to the potential/prospective RS a segment that was not reported by it. On the other hand, if the potential RS detects all the segments at block 60, the MMR-BS may check the values of the three segments against some predetermined threshold (e.g., SIR, signal strength) at block 64. If all of the reported segments (and in block 64 all three segments are reported) do not exceed the threshold, then the MMR-BS may assign at block 66 the segment which was reported with the least interference (e.g., the least signal strength of all reported) and the potential/prospective RS becomes active. If instead all segment values reported at block 60 exceed the threshold at block 64, the MMR-BS has two options 68. It can choose not to accept the potential/prospective RS as an active RS at block 70. Or the MMR-BS can allow the potential RS to act as a supportive relay in the operating coverage area at block 72. This means that the MMR-BS configures the potential/prospective RS to be fully managed, and assigns to it one or a set of segments and IDCells that is/are among those reported by the potential/prospective RS at block 60.

Figure 5:
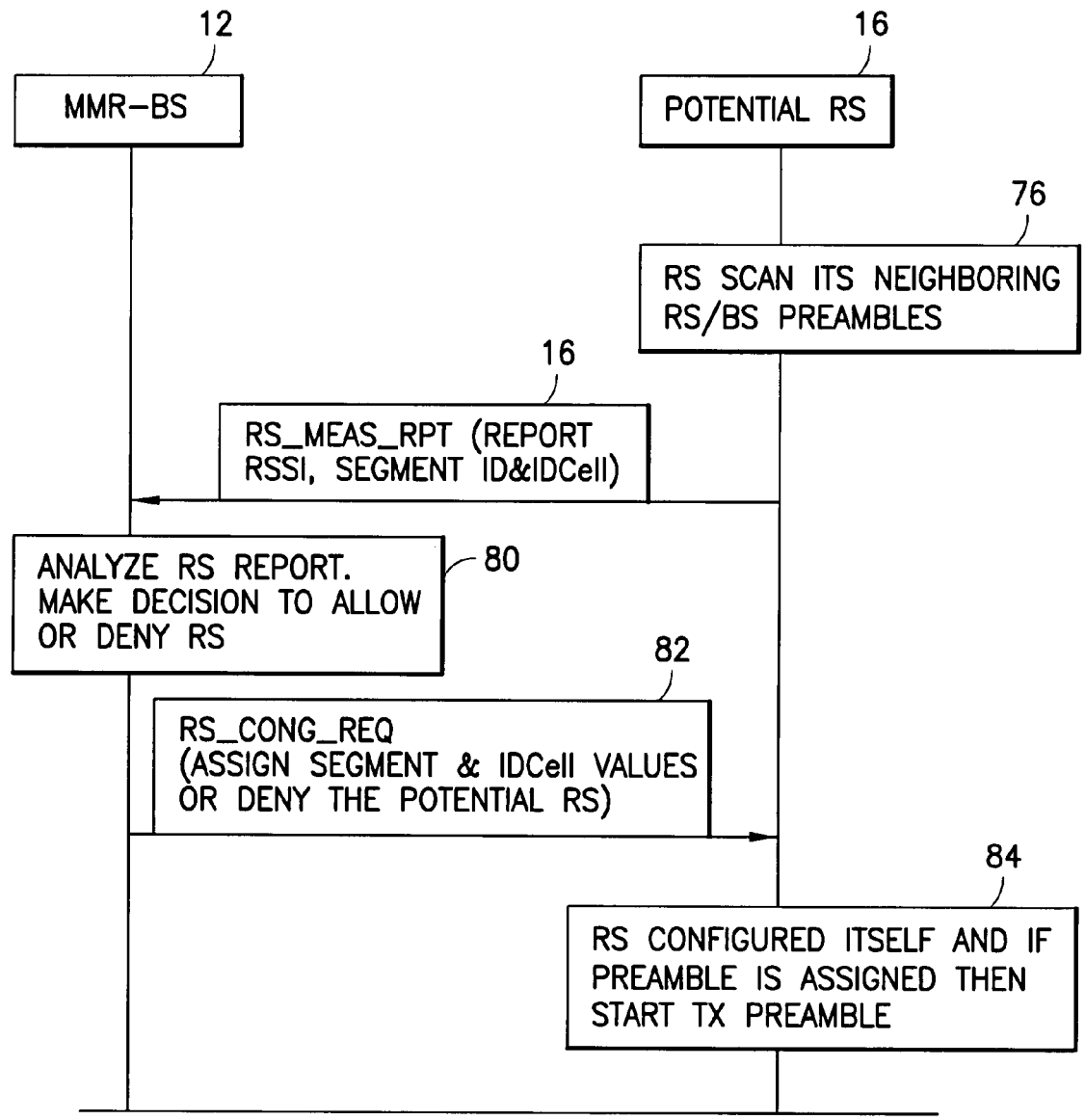
FIG. 5 is a signal diagram showing messages and actions of a base station and relay station for assigning a segment when a relay station first seeks to enter the network, according to an embodiment.

An exemplary message signaling of the initial RS segment assignment is shown in FIG. 5. Though it may be initiated in any number of ways (e.g., a request by potential RS to enter as a relay, a command by MMR-BS for the potential RS to scan its neighbors), the potential RS 16 begins scanning its neighbors' preambles at block 76. Those neighbors may be RSs and may include the BS or a BS of an adjacent cell. A RS Measurement Report 78 is sent from the potential RS 16 to the MMR-BS 12, which reports the RSSI (signal strength indicator of the RS or BS), the segment ID associated with that RSSI, and a cell ID in which that RS or BS operates. The MMR-BS 12 receives the report 78 and analyzes the data 80 in view of traffic, its knowledge of other active RSs in the cell, and the like. Whether or not the MMR-BS decides to allow the potential RS 16 to become active, it sends a RS Configuration Request message 82 to the potential RS 16. To direct the potential RS 16 to become active, that message 82 includes the segment assignment and ID cell values. The RS Configuration Request message 82 may also be used to deny the potential RS 16 from becoming active, in which case no segment is provided. At block 84, the potential RS 16 configures itself to begin a preamble transmission using the segment assigned in the message 82 (if so assigned). Else, the potential RS 16 does not become an active RS.

The following examples further clarify the initial assignment aspects of the invention. In a first example, the potential RS reports to the MMR-BS that it has detected two BSs or RSs in the area (e.g., RS0 and RS1, respectively), that have the pair (segment, IDCell) as following: RS0=(0,11) and RS1=(2,23). In this case the MMR-BS can enable the potential RS to operate as a relay (an active RS) by assigning to it the segment 1, which has not been detected as being used in the area of operation or reported by the potential RS to the MMR-BS.

Figure 6:
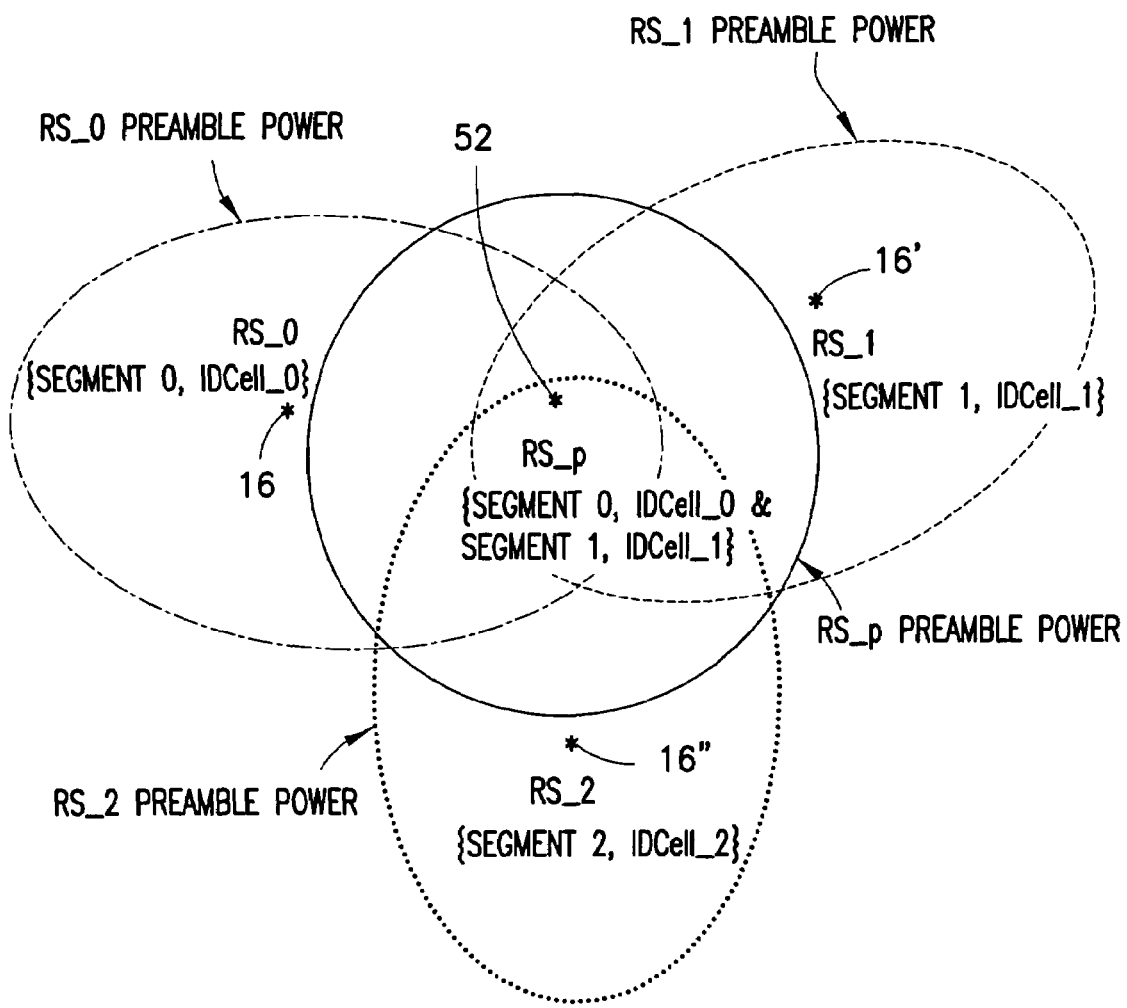
FIG. 6 is similar to FIG. 3A, but where the relay station seeking entry into the network is proximal to other operating relay stations that use all available segments.

In a second example shown in FIG. 6, the potential RS 52 detects the presence of the following BSs or RSs: RS0=(0, 11), RS1=(1,30), and RS2=(2,23), reference numbers 16, 16' and 16", respectively. Assume that the signal strengths from these RSs are relatively strong, above a certain predetermined threshold value (the threshold value being implementation dependent). Then, the MMR-BS may conclude that the area where the potential RS 52 is located is well served, so it may choose not to enable this potential RS 52. Alternatively, now assume that the signal strength reported for the RS0 16 and RS1 16' are below the threshold value mentioned above. The MMR-BS can choose in this case to enable the potential RS 52 to operate as being fully managed (wherein it does not do its own scheduling, its scheduling is preferably done by the MMR-BS), and assigns to it RS={(0,11), (1,30)}. At the same time, the MMR-BS reconfigures the RS0 16 and RS1 16' to operate also as fully managed.

In the example immediately above, the MMR-BS assigns to the potential/now active RS 52 two segments rather than one segment. This is possible in the WiMAX system because different segments usually imply different operation frequencies, i.e. no frequency overlapping. This can be used in WiMAX or in other systems that use different types of sharing orthogonal channels. Note that in this case the RS will be acting as a hidden relay (everything is transparent) for the MSs that are served already by RS0 16 and RS1 16'. The newly activated RS 52 may be considered to act as another transmission antenna of RS0 16 or RS 1 16' at any given time so as to improve the coverage area and system capacity. The newly activated RS 52 does not operate with its own segment, but transmits the same signals to the same MSs as is done by the adjacent and previously active RSs RS0 16 and RS1 16'. Scheduling in the MMR-BS enables such simultaneous transmissions.

Note that in order to enable an RS, the BS may consider some issues in addition to availability of radio resources such as segments. Such other issues might include the traffic in the area where the RS would operate, interference that it may generate to the neighbor RSs/BSs, etc.

Figure 7:
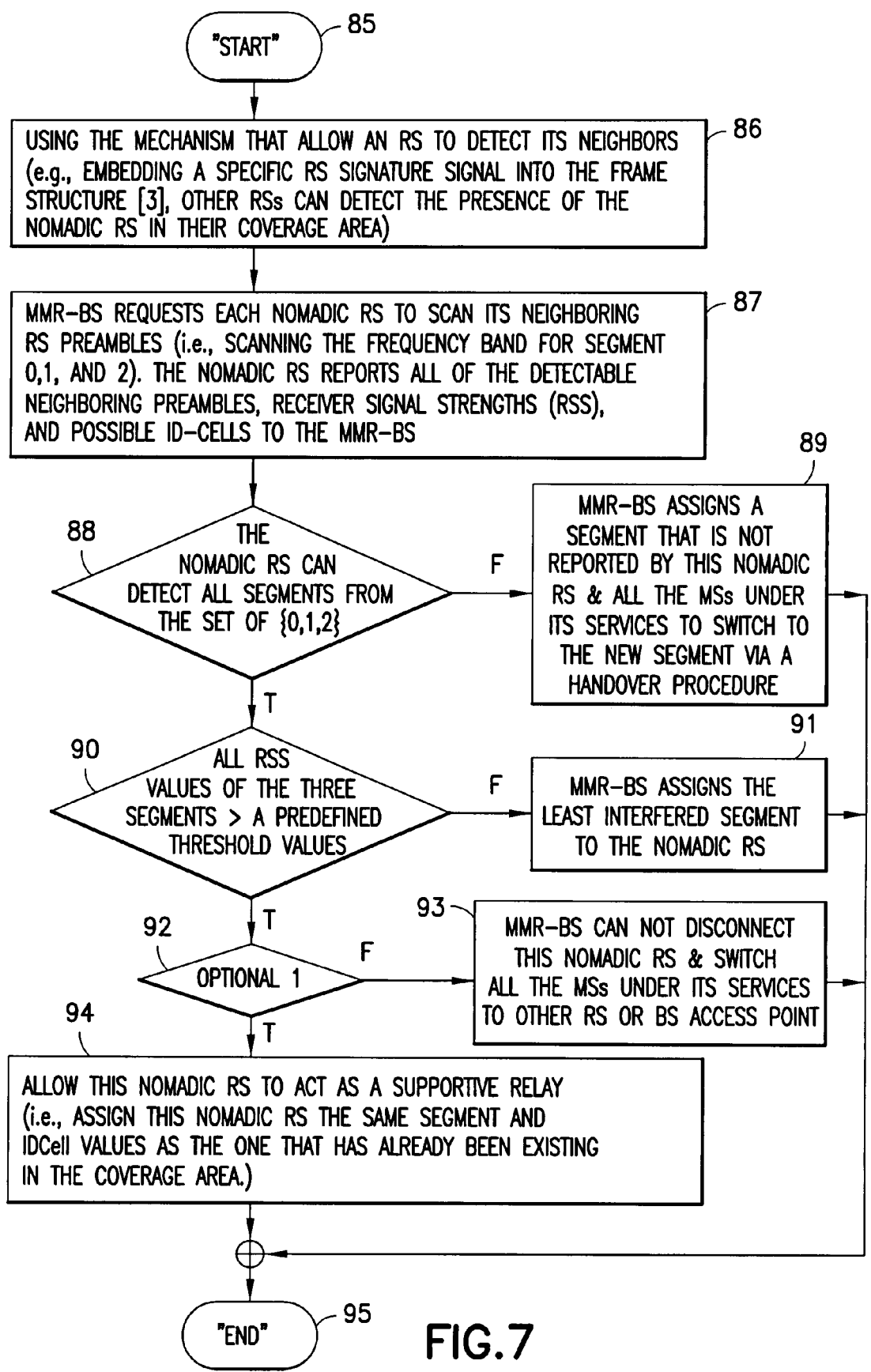
FIG. 7 is a series of process steps for re-assigning a segment to a RS that may be moving through a cell.

Now are detailed embodiments wherein a segment is reassigned. Such a reassignment might be warranted when a RS is non-stationary. As it moves through the cell, the moving RS may come into proximity to other RSs or the BS so that it would interfere if it remained on its originally assigned segment. This aspect of the invention addresses that concern, and is shown in FIG. 7. After the client-based "nomadic" RS has registered to the MMR-BS, it is capable of moving around. In this case, two RSs (any of nomadic/mobile/fixed RS) or the RS and the BS may end up being closely located and if they have the same segment value, they would interfere with each other. In order to reduce the interference due to the RS mobility, following is a segment re-assignment method associated with a mobility management scheme between the nomadic RS and its serving MMR-BS.

First is described periodic detection for interferences or potential interferences. Using the mechanism noted above for a potential RS to detect its neighbors, e.g., by embedding into the frame structure a specific RS signature signal that is transmitted at well-known time instants, each RS can detect, with periodic scanning of RS signature signal transmissions, the presence of the nomadic RSs moving into their coverage area as in block 86 of FIG. 7, and can inform the BS of its detection of the nomadic RS. Similarly, the nomadic RS can detect and inform the MMR-BS of other RSs that it detects as it moves closer to them, as in block 87 of FIG. 7. The BS, knowing the configuration of each RS in the cell/sector (including the nomadic RSs), can evaluate if the RSs detecting one another might interfere (e.g., they have the same segment value). If the BS determines that this situation exists, the BS may proceed with reassigning the segment value for one of the interferer RSs, whether it is the nomadic RS or a stationary RS. The BS needs only one report from an RS to determine whether to reassign or not. In the event that the detected and reported RS does not use the same segment as the RS doing the detecting and reporting, no reassignment is necessary. While the below description details detecting by and reporting by and handing over of the nomadic RS, the re-assignment may be to a stationary RS using similar procedures, in the event it is determined to re-assign a stationary RS rather than the nomadic RS.

At block 88, it is determined whether the nomadic RS has detected and reported all three segments, whereby no segments are available for reassigning that would not interfere. If not all three segments are reported, then at block 89 the MMR-BS assigns a segment to the nomadic RS that is not reported, and directs all MSs under control of that nomadic RS to switch to the new segment via a handover procedure. Note that there is no actual handover of MSs from one RS to another at block 89; the handover procedures are used to affect a handover of the MSs to the same nomadic RS on the new segment.

If instead all of the three segments are reported by the nomadic RS at block 88, then the values are checked against a threshold at block 90 (similar to block 64 of FIG. 4). If all of the reported segments (and in block 90 all three segments are reported) do not exceed the threshold, then the MMR-BS may assign at block 91 the segment which was reported with the least interference (e.g., the least signal strength of all reported), and the handover procedure noted above for all the MSs under control of the re-assigned RS are switched over, along with the nomadic RS, to the new segment. If instead all segment values reported at block 88 exceed the threshold at block 90, the MMR-BS has two options 92. It can choose to disconnect/disable the nomadic RS at block 93 by withdrawing its segment assignment and changing all of the MSs under its control to another active RS (e.g., via the handover procedure which in this case is a true handover, though the segment monitored by the handed-over MSs may not change in certain instances). Or the MMR-BS can allow the nomadic RS to act as a supportive relay in the operating coverage area at block 94. In this instance, the nomadic RS may or may not be re-assigned, or it may be re-assigned an additional segment as in the above example where the initial entry RS was assigned two segments. In the supportive relay scenario, the MMR-BS again operates the nomadic RS in a fully-managed mode, scheduling itself the traffic through the nomadic RS.

Recall that in the initial network entry stage, the MMR-BS assigns a segment "0", "1", or "2" to each of the RSs in its coverage area. The MMR-BS can simply reassign a different segment value to one of the RSs that interfere, via a configuration signaling as shown by example in FIG. 8. The RS 16 scans its neighbors at block 801 and reports the results (RSSI, Segment ID, ID Cell, etc) in a RS Measurement Report at block 802. The MMR-BS 12 analyzes the RS report at block 803 and decides to allow or deny continued operation of the RS. If allowed, the MMR-BS 12 sends to the RS 16 a RS Configuration Request message 804 that tells the segment to which the RS will be re-assigned, the ID Cell, and either an indication to prepare for a handover/reassignment or a frame identifier at which the re-assignment will occur. The MMR-BS 12 or the RS 16 will request all the MSs 22 attached to the RS 16 that is being reconfigured/reassigned, to switch to the newly assigned preamble segment at a predetermined time via MOB_BSHO_REQ (mobile-base station handover request) at block 806, for the case where the handover is triggered by the MMR-BS 12 at block 805 as opposed to being commanded at block 804 at a frame certain.

Whether due to the trigger 805 or the frame N, the MS 22 then sends to the RS 16 and MMR-BS 12 a MOB_B-SHO_RSP (mobile-base station handover response) message 807 reporting the BS or RS identifier to which it is handed over.

Figure 8:
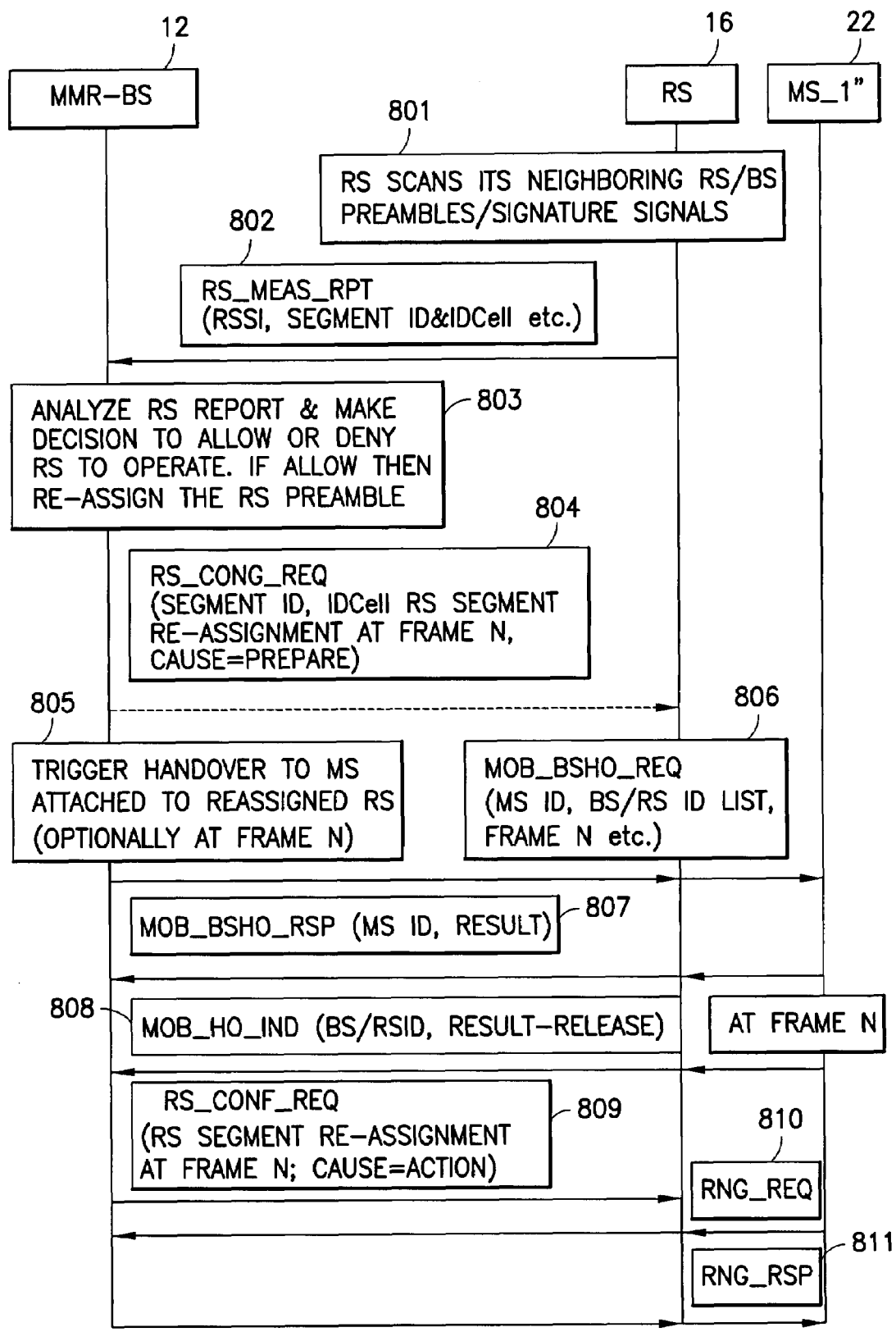
FIG. 8 is an exemplary signal diagram similar to FIG. 5, but for segment re-assignment.

Note that with this handover process, the MSs do not handover to another RS. Instead, the targeted RS is reassigned a new RS preamble segment value and all the MSs covered by this RS are switched to this newly reassigned RS preamble segment value with the same or different IDCell seen in FIG. 7. Exemplary message signaling of the periodic RS segment re-assignment is shown in FIG. 8.

It is important to note that the MSs attached to a nomadic RS also have the capability of scanning the environment in order to detect and update the active set of BSs/RSs that have the detection level energy above a certain threshold. Thus, an MS attached to a nomadic RS can always use the option of handover to a new RS, independent of whether or not the BS changes or not the segment value of the RS under which the MS currently falls. Note that the MMR-BS may consider it appropriate in some conditions to turn off the capability (e.g. when the corresponding area where the nomadic/mobile relay is located is well covered) of a RS (e.g., to remove that RS from being an active relay station in the cell) or configure it as a supportive RS as detailed above if two RSs interfere.

Figure 9:
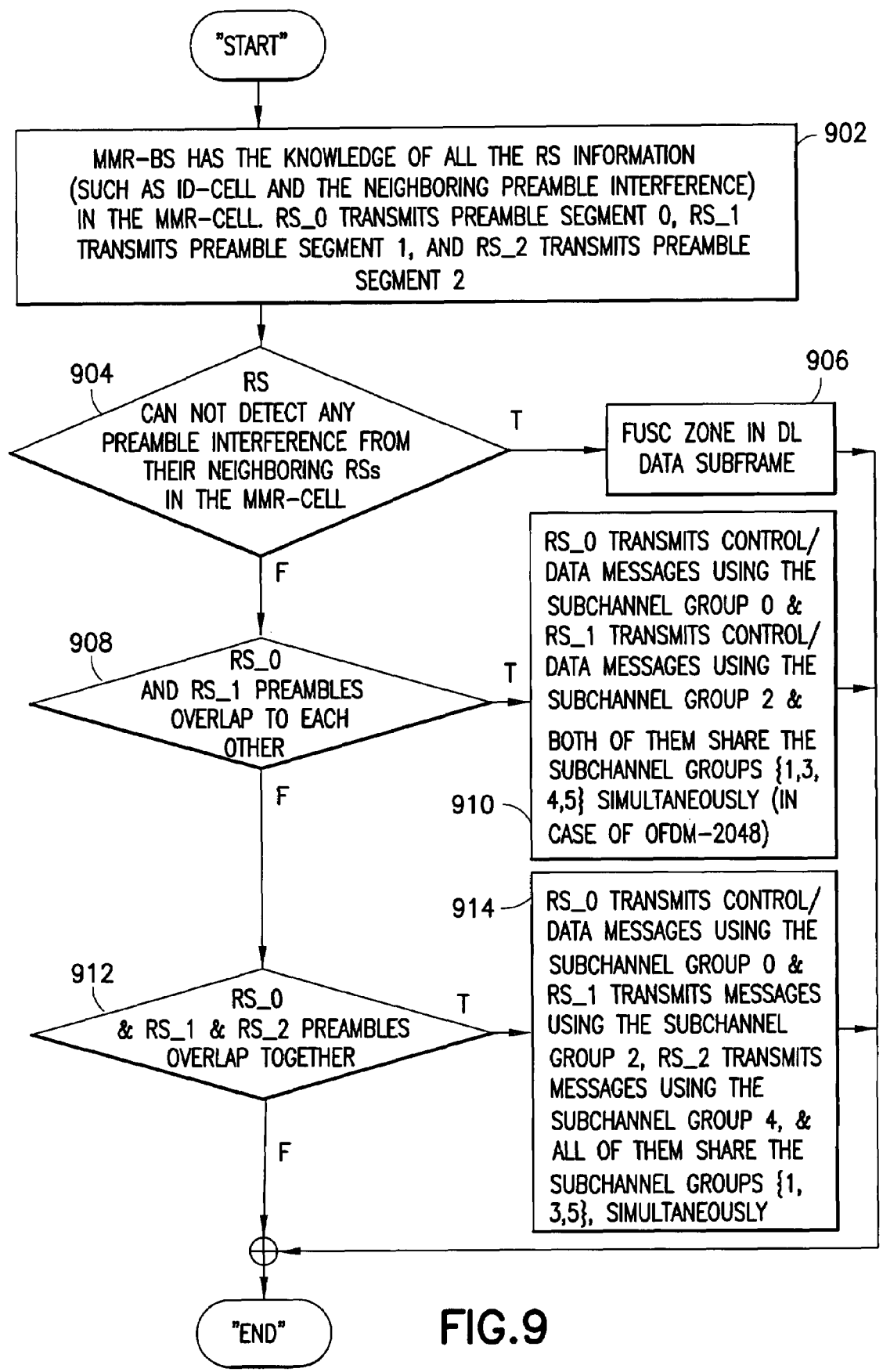
FIG. 9 is a series of process steps for determining when frequency re-use should be applied, and for assigning both shared and dedicated subchannels to interfering RSs in a PUSC zone.

Now is discussed the aspect of frequency reuse. Based on the initial RS segment assignment detailed above, the MMR-BS has the knowledge at block 902 of all of the RS information (such as RS ID-Cell and the neighboring preamble interference conditions). In FIG. 9, if the RSs in the MMR-cell can not detect any of their neighboring RS preambles at block 904, than these RSs can transmit any preamble segment and control/data messages using FUSC zone at block 906 as defined in 802.16e-2005. If the preambles of two RSs, RS_0 (i.e., it transmits segment 0 preamble) and RS_1 (i.e., it transmits segment 2 preamble), are coverage overlapped to each other as at block 908, then one of them (e.g., RS_0) can transmit control/data messages using its subchannel group and the other of them (e.g., RS_1) can transmit control/data messages using its subchannel group, and both of them can share the subchannel groups {1, 3, 4, 5}, simultaneously as at block 910. If all three RS preambles RS_0, RS_1, and RS_2 are coverage overlapped together as at block 912, then RS_0 can transmit control/data messages using the subchannel group 0, RS_1 can transmit control/data messages using the subchannel group 2, RS_2 can transmit control/data messages using the subchannel group 4, & all of them share the subchannel groups {1, 3, 5}, simultaneously as at block 914. The concept is to apply the FUSC zone frequency reuse for the interference-free RSs and the PUSC zone frequency reuse for the coverage overlapped RSs.

This invention describes an MMR-enabled approach for WiMAX system, though it may be extended to other MMR systems with RSs under control of a BS that assigns limited resources to those RSs. The design of RS segment assignment is based on the information of initial RS neighbor detection and RS segment re-assignment is based on the information of periodic RS overlap detection. After RS segment assignment, the MMR-BS has the knowledge of the interference situations of all RSs in the MMR-cell. Therefore, the frequency reuse application of allocating FUSC or PUSC zone can be determined. The frequency reuse capability is a particularly important approach to increase the data throughput in the MMR-enabled systems.

Based on the foregoing it should be apparent that the exemplary embodiments of this invention provide a method, apparatus and computer program product(s) to assign or re-assign limited radio resources to a relay station operating under control of a base station. A RS (potential or active) detects its neighbor's allocated resources and reports those detected resources (the detected segments in preambles) to the BS. The BS assigns or re-assigns the radio resources to the RS based on the reported resources in a manner to reduce or eliminate interference among the RSs in the assigned or re-assigned radio resources. For the case where the reported resources comprise all sets of radio resources available to the BS for allocating to RSs, the BS may constrain one of the RSs to act in a supportive role to replicate the transmissions of another RS, where the BS schedules transmissions of the constrained RS and possibly also the another RS. For the case where the reported resources do not represent all resources available to the BS for allocation to RSs, then an RS may be assigned or reassigned resources other than those reported.

Further in accordance with the described embodiments, a method, apparatus and computer program product(s) are provided by which a BS determines from RS reports whether there is preamble interference among the reporting RSs. In the case where there is interference reported, whether for some preamble resources but not all preamble resources, the BS allocates partial usage of resources (e.g., subchannels) among those RSs reported as interfering, wherein those interfering RSs send uplink control and data messages on both dedicated resources that they do not share amongst themselves and shared resources that they each share.

Additional to the frequency considerations above, power considerations may be used to facilitate resource reuse. Consider again that in the MR-BS (Multihop Relay-Base Station) system, neighboring RS (Relay Station) coverage area may be overlapped with a different preamble segment value as defined in the PUSC mode application. In order to increase the MR-BS system capacity, an aspect of this invention controls transmission power of the RS, even for each data burst, in order to reduce unnecessary channel interference. An exemplary power control step size of 1 dB may be used for this power control. The rate at which this power control is applied can be synchronized to the rate of handover measurement reports, such as the currently used update rate (about every 0.5 seconds).

For further increasing the possibility for channel reuse, the network channel management algorithm detailed above may be used to group a set of SSs/MSs from each of different RSs within the MR-BS coverage. This grouped set may be, for example, all MSs/SSs whose reported/calculated carrier to interference ratio C/I is above some pre-defined threshold value. Grouping by a C/I parameter enables the MSs/SSs of the group to reuse the same channel simultaneously. In the MR-BS system, during a handover process the MS reports channel measurement results. From these reported measurements, the serving cell knows the C/I ratio and the neighboring cell knows the received signal strength. These values may be reported directly, or computed by the serving cell/neighboring cell based on some other parameter reported by the SS. However determined, these measurements are reported by the SS at approximately 0.5 second intervals.

After the handover process when the SS no longer reports at 0.5 second intervals, the received C/I value for each MS under its serving RS can then be estimated. If the MS with the estimated C/I value is higher than the pre-defined threshold value, the serving RS can, in response, decrease its transmission power to that particular MS, thereby maintaining all the MSs under its control with a similar receive power from the serving RS. By applying such a power control mechanism at the RS, the RS can reduce the co-channel interference from the neighboring RSs, as seen in FIG. 10.

Figure 10:
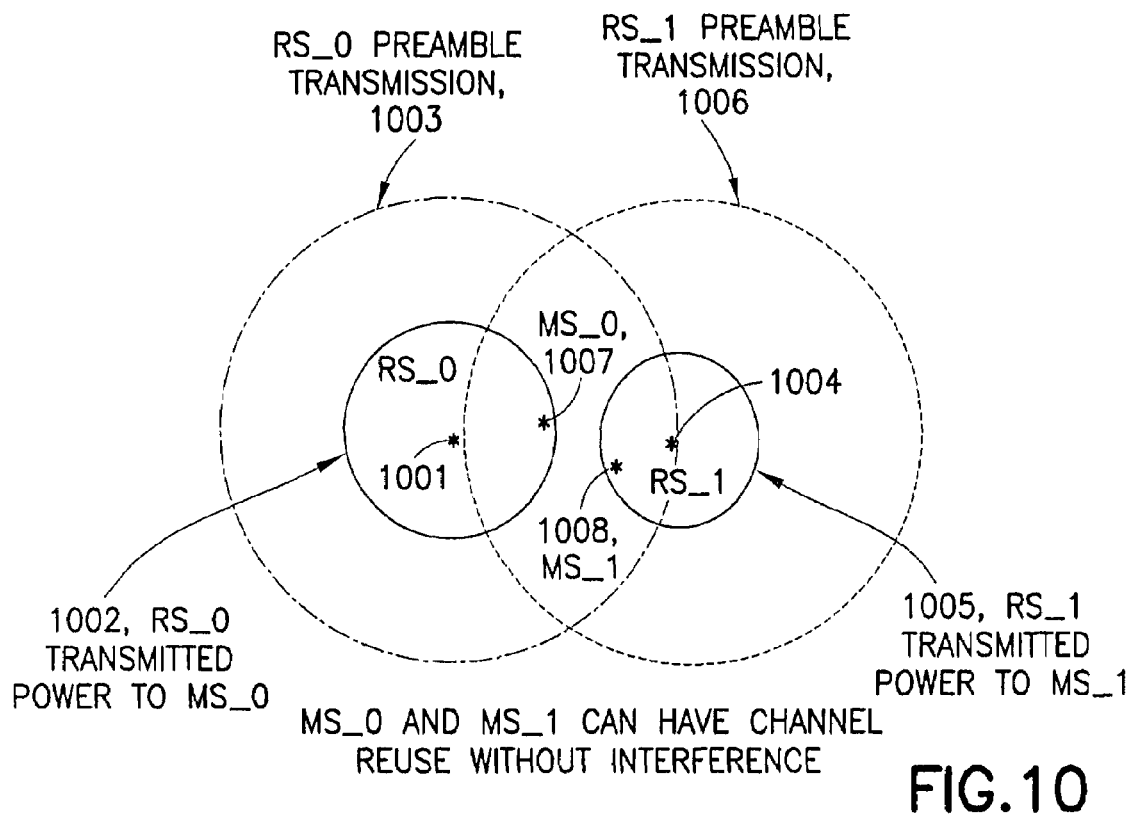
FIG. 10 is similar to FIG. 3A, but showing reduction of the data signal/payload range resulting from a power control mechanism according to an embodiment of the invention to avoid co-channel interference.

In FIG. 10, RS_0 1001 located at the center of the solid-line circle 1002 defined by payload transmission power to its MS_0 1007 is the serving cell for that MS_0 1007. The concentric dashed line 1003 shows preamble transmission power for RS_0 1001. In a neighboring cell, a neighboring RS_1 1004 is located at the center of its solid-line circle 1005 defining the payload transmission power from RS_1 1004 to another MS_1 1008 served by that neighboring RS_1 1004. The concentric dashed line 1006 shows the preamble power 1006 for RS_1 1004. One or both of the RSs 1001, 1004 reduce their payload transmission power 1002, 1005 so that their respective solid-line circle 1002, 1005 does not encompass the MS 1008, 1007 under control of the adjacent RS 1004, 1001. Note that this potential problem is particularly acute when one of the MSs 1007, 1008 is near the edge of the serving area of its serving RS 1001, 1004, so using the handover-related measurement reports from the MS 1007, 1008 is particularly well adapted to using power control as an interference suppression/avoidance technique, and the C/I or signal strength compared to some pre-determined threshold is used as an indicator to the serving/neighboring RS 1001, 1004 that the MS 1007, 1008 is near a cell edge. For this same reason, the power control increments can be applied on each burst sent to or from the MS 1007, 1008, since such fine power control would be present only for bursts to or from the MS 1007, 1008 when its C/I or received signal strength exceeds the threshold. Absent one or both of the RSs 1001, 1004 reducing its payload transmit power, its solid-line circle 1002, 1005 would encompass the MS 1008, 1007 that is served by the adjacent RS 1004, 1001. Using the power control detailed above, the MS_0 1007 served by one RS_0 1001 may thereby reuse a channel simultaneously without interference from the other MS-1 1008 that is served by the neighboring RS_1 1004.

Figure 11:
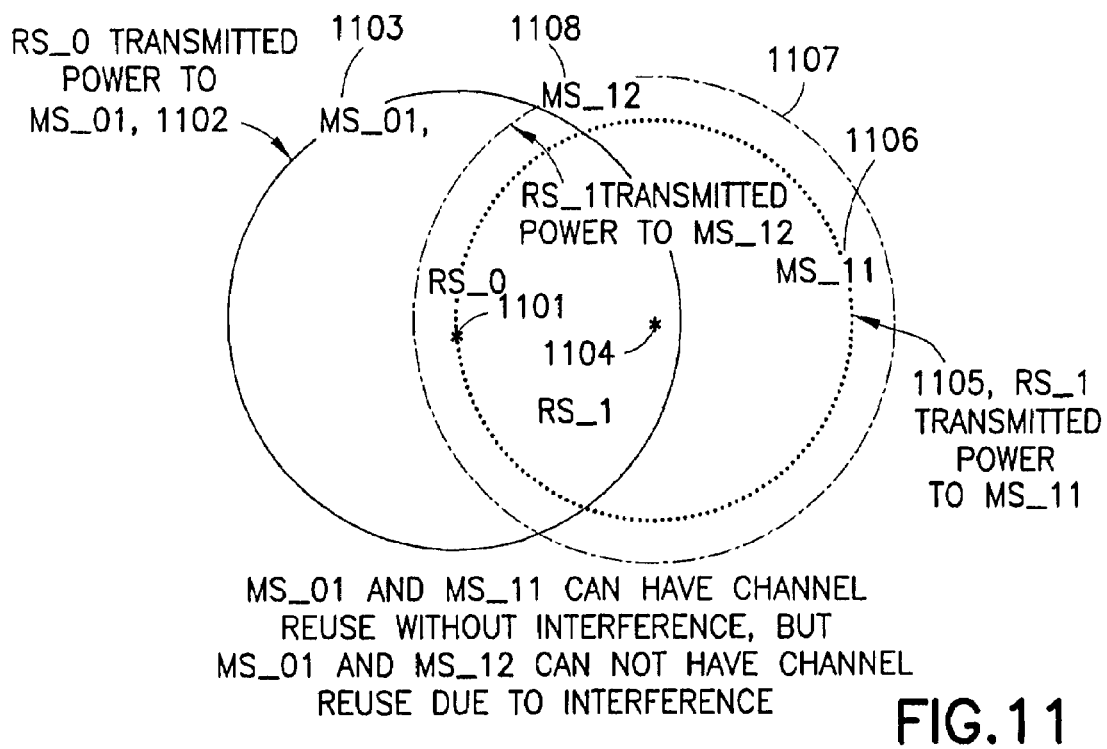
FIG. 11 is similar to FIG. 3A, illustrating an instance where channel management groups the three illustrated subscriber stations differently to avoid co-channel interference.

Now consider FIG. 11, which also shows a first RS_0 1101 centered in its circle 1102 of payload transmit power to a first MS-01 1103 and a neighboring RS_1 1104 centered in its circle 1105 of payload transmit power to a second MS-11 1106. Also shown is the circle 1107 of preamble transmit power from the second RS_1 1104, and a third MS_12 1108 within that preamble circle 1107 and under control of the first RS_0 1101 (but soon to undergo a serving cell change to the second RS_1 1104). Even applying the RS power control scheme at each burst data as detailed above, the channels for the first MS_01 1102 and third MS_12 1108 may still interfere with each other. In this instance, network channel management is used (e.g., a channel management algorithm) so that channel reuse is applied to the group of SSs that include the first MS_01 1103 and the second MS_11 1106, but channel management would not select channel reuse to the group of SSs that include the first MS_01 1103 and the third MS_12 1106 since they have strong channel interference.

While detailed above with particular examples directed toward downlink channels (RS to SS), the same channel reuse concept could also used for uplink channels.

Figure 12:
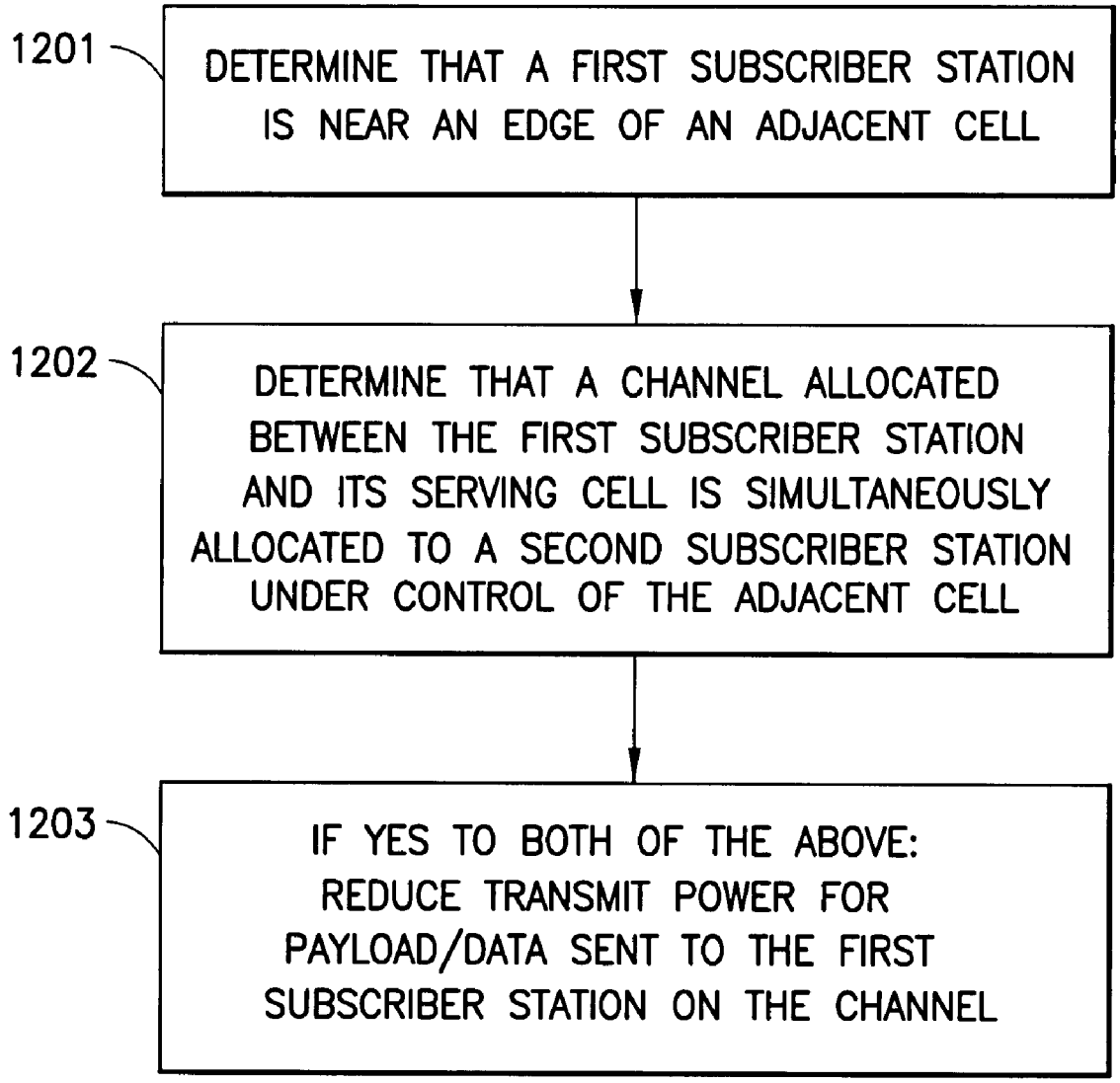
FIG. 12 shows a series of process steps for executing the power control mechanism described with reference to FIG. 10.

FIG. 12 shows process steps associated with the power-control aspects of the invention. At step 1201, it is determined that a first subscriber station is near an edge of a neighboring cell. At step 1202, it is determined that a channel, currently allocated between the first subscriber station and a network node of the first subscriber station's serving cell (e.g., a BS or RS), is simultaneously allocated to a second subscriber station that is under control of a network node of the adjacent serving cell. The order of steps 1201 and 1202 can be reversed, as they are independent inquiries. Conditional on both determinations, then at step 1203 the transmit power on the channel is reduced for payload/data sent to the first subscriber station. As above, the determining of step 1201 can be from measurement reports sent from the first subscriber station and compared against a predetermined threshold. The determining of step 1202 can be from a status signal received from a higher network node (e.g., a BS or RNC) or signaling between the two adjacent RSs. Further, different SSs may be grouped as above within the process of FIG. 12. These process steps may be embodied in computer software stored on a computer readable medium, or in hardware or a combination of hardware and software, and may be executed as a method by the network node controlling the first subscriber station.

In general, the various embodiments may be implemented in hardware or special purpose circuits, software, logic or any combination thereof For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, or as signaling formats, or by using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well-established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. However, any and all modifications of the exemplary embodiments of this invention will still fall within the scope of the non-limiting embodiments of this invention.

Furthermore, some of the features of the various non-limiting embodiments of this invention may be used to advantage without the corresponding use of other features. As such, the foregoing description should be considered as merely illustrative of the principles, teachings and exemplary embodiments of this invention, and not limitations thereof.

We claim:

1. A method comprising:
receiving, from a prospective relay station, a report indicative of radio resource sets in use by neighbor nodes of the prospective relay station;
for the case where the reported radio resource sets comprise all available radio resource sets, grouping the prospective relay with the neighbor nodes using a selected radio resource set indicated in the report; and
sending, to the prospective relay station, a message indicative of an assigned radio resource set and an identifier for the prospective relay station to change the prospective relay station to an enabled relay station that is enabled for a managed mode,
where, in a managed mode, traffic through the enabled relay station is scheduled by a base station.

2. The method of claim 1, wherein each radio resource set comprises a preamble segment and the message comprises a relay station configuration request message.

3. The method of claim 1, wherein the identifier assigned to the prospective relay station is also assigned to one of the neighbor nodes.

4. The method of claim 1, further comprising signaling another enabled relay station having the same assigned radio resource set to operate in the managed mode.

5. The method of claim 1, wherein each of the radio resource sets is a preamble segment and the report comprises an indicator of which radio resource set was received with a lowest signal strength.

6. The method of claim 1, wherein the enabled relay station comprises an enabled mobile relay station; the method further comprising:
receiving from the enabled mobile relay station a measurement report indicative of neighbor preamble segments and an indication of which of the neighbor preamble segments was received with a lowest signal strength;
determining from the measurement report a preamble segment to reassign to the enabled relay station; and
using handover procedures to effect handover of all subscriber stations associated with the enabled mobile relay station from the assigned radio resource set of the enabled mobile relay station to the reassigned preamble segment of the enabled mobile relay station at one of a predetermined time or a predetermined frame.

7. The method of claim 6, wherein using the handover procedures comprises switching all mobile stations attached to the enabled mobile relay station to switch to the reassigned preamble segment at a predetermined time via a mobile-base station handover request message.

8. The method of claim 1 further comprising;
receiving channel measurement reports from a plurality of subscriber stations;
grouping the subscriber stations according to the received measurement reports without regard to which relay station they are associated; and
sending power control messages to at least one of the subscriber stations in the group and associated with the enabled relay station to suppress co-channel interference with another of the subscriber stations in the group that is associated with a different relay station by reducing transmit power for payload without reducing transmit power for preambles for the radio resource set in use by the enabled relay station.

9. The method of claim 1, further comprising sending power control messages to the enabled relay station to reduce co-channel interference between the enabled relay station and another relay station and increase channel reuse probability in the relay stations by reducing transmit power for payload without reducing transmit power for preambles for the radio resource set in use by the enabled relay station and by the another relay station.

10. An apparatus comprising:
a memory storing a program of computer executable instructions; and
at least one processor;
in which the memory storing the program of computer executable instructions is configured with the at least one processor to cause the apparatus at least:
to receive, from a prospective relay station, a report indicative of radio resource sets in use by neighbor nodes of the prospective relay station;
for the case where the reported radio resource sets comprise all available radio resource sets, to group the prospective relay with the neighbor nodes using a selected radio resource set indicated in the report; and
to send, to the prospective relay station, a message indicative of an assigned radio resource set and an identifier for the prospective relay station to change the prospective relay station to an enabled relay station that is enabled for a managed mode,
where, in a managed mode, traffic through the enabled relay station is scheduled by the base station.

11. The apparatus of claim 10, wherein each radio resource set comprises a preamble segment and the message comprises a relay station configuration request message.

12. The apparatus of claim 11 comprising a base station, wherein the identifier assigned to the prospective relay station is also assigned to one of the neighbor nodes.

13. The apparatus of claim 11 comprising a base station, wherein the identifier assigned to the prospective relay station is also assigned to one of the neighbor nodes.

14. The apparatus of claim 10, wherein each of the radio resource sets is a preamble segment and the report comprises an indicator of which radio resource set was received with a lowest signal strength.

15. The apparatus of claim 10, wherein the enabled relay station comprises an enabled mobile relay station; wherein:
the apparatus further comprises a receiver adapted to receive from the enabled mobile relay station a measurement report indicative of neighbor preamble segments and an indication of which of the neighbor preamble segments was received with a lowest signal strength; and
the memory storing the program of computer executable instructions is configured with the at least one processor to cause the apparatus at least further
to determine from the measurement report a preamble segment to reassign to the enabled relay station; and
to use handover procedures to effect handover of all subscriber stations associated with the enabled mobile relay station from the assigned radio resource set of the enabled mobile relay station to the reassigned preamble segment of the enabled mobile relay station at one of a predetermined time or a predetermined frame.

16. The apparatus of claim 15, wherein adapted to use the handover procedures comprises switching all mobile stations attached to the enabled mobile relay station to switch to the reassigned preamble segment at a predetermined time via a mobile-base station handover request message.

17. The apparatus of claim 10, wherein the memory storing the program of computer executable instructions is configured with the at least one processor to cause the apparatus at least further:
   to receive channel measurement reports from a plurality of subscriber stations;
   to group the subscriber stations according to the received measurement reports without regard to which relay station they are associated; and
   to send power control messages to at least one of the subscriber stations in the group and associated with the enabled relay station to suppress co-channel interference with another of the subscriber stations in the group that is associated with a different relay station by reducing transmit power for payload without reducing transmit power for preambles for the radio resource set in use by the enabled relay station.

18. The apparatus of claim 10, wherein the memory storing the program of computer executable instructions is configured with the at least one processor to cause the apparatus at least further to send power control messages to the enabled relay station to reduce co-channel interference between the enabled relay station and another relay station by reducing transmit power for payload without reducing transmit power for preambles for the radio resource set in use by the enabled relay station and by the another relay station.

19. A non-transitory computer readable memory storing a program of machine-readable instructions executable by a digital data processor to perform actions directed toward assigning radio resources to a relay station, the actions comprising:
   receiving, from a prospective relay station, a report indicative of radio resource sets in use by neighbor nodes of the prospective relay station;
   for the case where the reported radio resource sets comprise all available radio resource sets, grouping the prospective relay with the neighbor nodes using a selected radio resource set indicated in the report; and
   sending, to the prospective relay station, a message indicative of an assigned radio resource set and an identifier for the prospective relay station to change the prospective relay station to an enabled relay station that is enabled for a managed mode,
   where, in a managed mode, traffic through the enabled relay station is scheduled by the base station.

20. The non-transitory computer readable memory of claim 19, wherein the identifier assigned to the prospective relay station is also assigned to one of the neighbor nodes.

21. The non-transitory computer readable memory of claim 19, wherein each of the radio resource sets is a preamble segment and the report comprises an indicator of which radio resource set was received with a lowest signal strength.

22. The non-transitory computer readable memory of claim 19, wherein the enabled relay station comprises an enabled mobile relay station; the actions further comprising:
   receiving from the enabled mobile relay station a measurement report indicative of neighbor preamble segments and an indication of which of the neighbor preamble segments was received with a lowest signal strength;
   determining from the measurement report a preamble segment to reassign to the enabled relay station; and
   using handover procedures to effect handover of all subscriber stations associated with the enabled mobile relay station from the assigned radio resource set of the enabled mobile relay station to the reassigned preamble segment of the enabled mobile relay station at one of a predetermined time or a predetermined frame.

23. An apparatus comprising:
   receiving means for receiving, from a prospective relay station, a report indicative of radio resource sets in use by neighbor nodes of the prospective relay station;
   for the case where the reported radio resource sets comprise all available radio resource sets, means for grouping the prospective relay with the neighbor nodes using a selected radio resource set indicated in the report; and
   transmitting means for sending, to the prospective relay station, a message indicative of the assigned radio resource set and an identifier for the prospective relay station to change the prospective relay station to an enabled relay station that is enabled for a managed mode,
   where, in a managed mode, traffic through the enabled relay station is scheduled by the base station.

24. The apparatus of claim 23 comprising a base station;
   wherein the identifier assigned to the prospective relay station is also assigned to one of the neighbor nodes;
   the receiving means comprises a receiver;
   the processing means comprises a digital processor; and
   the transmitting means comprises a transmitter.

25. A method comprising:
   scanning neighbor nodes for radio resource sets in use by the neighbor nodes;
   wirelessly sending a report indicative of the radio resource sets;
   for the case where are a reported radio resource sets comprise all available radio resource sets, grouping with the neighbor node using a selected radio resource set indicated in the report; and
   in response to receiving a message indicative of an assigned radio resource set and an identifier, relaying traffic using the assigned radio resource set in a managed mode where the relayed traffic is scheduled by a base station.

26. The method of claim 25, wherein each of the radio resource sets is a preamble segment and the report comprises an indicator of which radio resource set was received with a lowest signal strength.

27. The method of claim 25, further comprising after receiving the message:
   wirelessly sending a measurement report indicative of neighbor preamble segments and an indication of which of the neighbor preamble segments was received with a lowest signal strength; and
   using handover procedures to effect a change from the assigned radio resource set to a reassigned preamble segment at one of a predetermined time or a predetermined frame.

28. The method of claim 27, wherein using the handover procedures comprises relaying to all associated mobile stations a handover message to switch to the reassigned preamble segment at a predetermined time.

29. An apparatus comprising:
   a memory storing a program of computer executable instructions; and
   at least one processor;
   in which the memory storing the program of computer executable instructions is configured with the at least one processor to cause the apparatus at least:
   to scan neighbor nodes for radio resource sets in use by the neighbor nodes;
   to wirelessly send a report indicative of the radio resource sets;

for the case where the reported radio resource sets comprise all available radio resource sets, grouping with the neighbor node using a selected radio resource set indicated in the report; and in response to receiving at the receiver a message indicative of an assigned radio resource set and an identifier, to relay traffic using the assigned radio resource set in a managed mode where the relayed traffic is scheduled by a base station.

30. The apparatus of claim 29, wherein each of the radio resource sets is a preamble segment and the report comprises an indicator of which radio resource set was received with a lowest signal strength.

31. The apparatus of claim 29, wherein after receiving the message the memory storing the program of computer executable instructions is configured with the at least one processor to cause the apparatus at least further:

to wirelessly send a measurement report indicative of neighbor preamble segments and an indication of which of the neighbor preamble segments was received with a lowest signal strength; and to use handover procedures to effect a change from the assigned radio resource set to a reassigned preamble segment at one of a predetermined time or a predetermined frame.

32. The apparatus of claim 31, wherein the memory storing the program of computer executable instructions is configured with the at least one processor to cause the apparatus at least further to use the handover procedures by relaying to all mobile stations associated with the apparatus a handover message to switch to the reassigned preamble segment at a predetermined time.

33. The apparatus of claim 29 comprising a relay station.

* * * * *

UNITED STATES PATENT AND TRADEMARK OFFICE
CERTIFICATE OF CORRECTION

| | | |
|---|---|---|
| PATENT NO. | : 8,165,073 B2 | Page 1 of 1 |
| APPLICATION NO. | : 11/888800 | |
| DATED | : April 24, 2012 | |
| INVENTOR(S) | : Wang et al. | |

It is certified that error appears in the above-identified patent and that said Letters Patent is hereby corrected as shown below:

Claim 13, col. 16, line 38 delete claim 13 in its entirety and insert --13. (Previously Presented) The apparatus of claim 10, in which the memory storing the program of computer executable instructions is configured with the at least one processor to cause the apparatus at least further to signal another enabled relay station having the same assigned radio resource set to operate in the managed mode--.

Signed and Sealed this
Twenty-eighth Day of August, 2012

David J. Kappos
*Director of the United States Patent and Trademark Office*